(12) United States Patent
Fujiki et al.

(10) Patent No.: US 11,766,850 B2
(45) Date of Patent: Sep. 26, 2023

(54) LAMINATE

(71) Applicant: DAICEL-EVONIK LTD., Tokyo (JP)

(72) Inventors: Daisuke Fujiki, Tokyo (JP); Toshihiko Fujinaka, Tokyo (JP)

(73) Assignee: DAICEL-EVONIK LTD., Tokyo (JP)

( * ) Notice: Subject to any disclaimer, the term of this patent is extended or adjusted under 35 U.S.C. 154(b) by 297 days.

(21) Appl. No.: 17/256,727

(22) PCT Filed: Jul. 19, 2019

(86) PCT No.: PCT/JP2019/028424
§ 371 (c)(1),
(2) Date: Dec. 29, 2020

(87) PCT Pub. No.: WO2020/022204
PCT Pub. Date: Jan. 30, 2020

(65) Prior Publication Data
US 2021/0370649 A1 Dec. 2, 2021

(30) Foreign Application Priority Data
Jul. 24, 2018 (JP) ................. 2018-138165

(51) Int. Cl.
| | | |
|---|---|---|
| *B32B 27/08* | (2006.01) | |
| *B32B 7/023* | (2019.01) | |
| *B32B 3/30* | (2006.01) | |
| *B32B 15/095* | (2006.01) | |
| *B32B 15/20* | (2006.01) | |
| *B29C 51/14* | (2006.01) | |
| *B32B 27/34* | (2006.01) | |
| *B32B 27/40* | (2006.01) | |
| *C08L 75/04* | (2006.01) | |
| *C08L 77/02* | (2006.01) | |
| *C08L 77/06* | (2006.01) | |

(52) U.S. Cl.
CPC .............. *B32B 27/08* (2013.01); *B29C 51/14* (2013.01); *B32B 3/30* (2013.01); *B32B 7/023* (2019.01); *B32B 15/095* (2013.01); *B32B 15/20* (2013.01); *B32B 27/34* (2013.01); *B32B 27/40* (2013.01); *C08L 75/04* (2013.01); *C08L 77/02* (2013.01); *C08L 77/06* (2013.01); *B32B 2307/308* (2013.01); *B32B 2307/402* (2013.01); *B32B 2307/418* (2013.01); *B32B 2307/536* (2013.01); *B32B 2307/546* (2013.01); *B32B 2451/00* (2013.01)

(58) Field of Classification Search
CPC ........... B32B 27/08; B32B 3/30; B32B 7/023; B32B 15/095; B32B 27/34; B32B 27/40; B32B 2307/308; B32B 2307/402; B32B 2307/418; B32B 2307/536; B32B 2307/546; B32B 2451/00; B32B 2262/101; B32B 15/06; B32B 2255/205; B32B 2262/106; B32B 2307/40; B32B 2307/732; B32B 7/10; B32B 25/02; B32B 25/042; B32B 25/14; B32B 7/12; B32B 2255/10; B32B 15/20; B29C 51/14; B29C 51/10; C08L 75/04; C08L 77/02; C08L 77/06; C08G 69/40
See application file for complete search history.

(56) References Cited

U.S. PATENT DOCUMENTS

| | | | |
|---|---|---|---|
| 6,376,037 B1 * | 4/2002 | Montanari | ............ C08L 77/00 428/36.9 |
| 7,534,494 B2 | 5/2009 | Wakita et al. | |
| 2006/0108708 A1 | 5/2006 | Wakita et al. | |
| 2019/0099979 A1 * | 4/2019 | Bee | ............ B32B 27/08 |

FOREIGN PATENT DOCUMENTS

| | | |
|---|---|---|
| JP | 2010-173325 A | 8/2010 |
| JP | 2017-7109 A | 1/2017 |

OTHER PUBLICATIONS

Gong, S., Zhao, S., Chen, X., Liu, H., Deng, J., Li, S., Feng, X., Li, Y., Wu, X. and Pan, K. (2021), Thermoplastic Polyamide Elastomers: Synthesis, Structures/Properties, and Applications. Macromol. Mater. Eng., 306: 2100568. https://doi.org/10.1002/mame.202100568 (Year: 2021).*
International Preliminary Report on Patentability and Written Opinion of the International Searching Authority, with an English translation, dated Jan. 28, 2021, for International Application No. PCT/JP2019/028424.
International Search Report, dated Oct. 1, 2019, for International Application No. PCT/JP2019/028424, with an English translation.

* cited by examiner

*Primary Examiner* — John D Freeman
(74) *Attorney, Agent, or Firm* — Birch, Stewart, Kolasch & Birch, LLP

(57) ABSTRACT

Provided is a laminate that generates a structural color, where the laminate can be subjected to a deep-drawing process without deteriorating the color developing structure of the structural color. The laminate according to an embodiment of the present invention includes a polyamide layer (1) and a thermoplastic polyurethane layer (2) having a color developing structure of a structural color. The thermoplastic polyurethane layer (2) is preferably a thermoplastic polyurethane layer having a structure having recesses and protrusions on a face that is opposite a face in contact with the polyamide layer (1) or a layer formed by alternately laminating two types of thermoplastic polyurethanes having a difference in refractive indexes of 0.03 or greater.

16 Claims, No Drawings

LAMINATE

TECHNICAL FIELD

The present invention relates to a laminate that generates a structural color. The present application claims priority to the Japanese Patent Application No. 2018-138165 filed in Japan on Jul. 24, 2018, the content of which is incorporated herein.

BACKGROUND ART

In the field of, for example, containers, enhancement of a commercial value by decorating the surface has been performed. However, in the case where decoration is applied by using a coloring matter, such as a pigment or a dye, easy loss of its color has been a problem. Thus, application of decoration by a structural color, which is color development by, for example, diffraction, refraction, interference, and scattering of light, has been known. The structural color is color developed based on the structure, loss of its color does not occur, and bright color can be maintained for a long period of time.

Patent Document 1 describes a decorative film having an adhesive layer, in which an adhesive layer is provided on the back face of a decorative film that generates a structural color. Patent Document 1 describes a three-dimensional molded article generating a structural color can be obtained by adhering the decorative film having the adhesive layer to a base material and vacuum-molding the decorative film having the adhesive layer adhered to the base material. However, there have been problems of ease in deterioration of the adhesive layer over time and remarkable deterioration of good appearance caused by voids occurred in gaps due to poor adhesion.

CITATION LIST

Patent Document

Patent Document 1: JP 2017-007109 A

SUMMARY OF INVENTION

Technical Problem

Furthermore, when a laminate of the decorative film and a base material is subjected to a deep-drawing process, in the case where the base material is hard, the base material is softened by heating to allow the base material to conform to a mold. However, in the case where a base material having a high melting point is used, heat-molding at a high temperature is required, and the color developing structure of the structural color may be deteriorated due to the performance of heat-molding at the high temperature. On the other hand, in the case where a soft base material is used, the base material can adequately conform to a mold even when a heat-molding temperature is low and can be molded without deteriorating the color developing structure of the structural color. However, it was found that a soft base material is too soft and has difficulty in retaining the shape of a molded article obtained by a deep-drawing process.

Therefore, an object of the present invention is to provide a laminate that generates a structural color, where the laminate can be subjected to a deep-drawing process without deteriorating the color developing structure of the structural color.

Another object of the present invention is to provide a laminate that generates a structural color, where the laminate can be subjected to a deep-drawing process without deteriorating the color developing structure of the structural color and can maintain good appearance for a long period of time.

Another object of the present invention is to provide a method for producing a molded article which has been subjected to a deep-drawing process by using the laminate.

Solution to Problem

As a result of diligent research to solve the problems described above, the present inventors found the following.

1. Because a polyamide and a thermoplastic polyurethane are firmly bonded by chemical bonding, a polyamide layer and a thermoplastic polyurethane layer can be laminated without interposing an adhesive layer therebetween.

2. A polyamide is hard and has a function to retain the shape of a molded article while a thermoplastic polyurethane has excellent flexibility and suitably conforms to a deep-drawing process.

3. A polyamide softens at a temperature that does not decompose a thermoplastic polyurethane and can be molded.

4. A laminate obtained by adhering a polyamide and a thermoplastic polyurethane having a color developing structure of a structural color by chemical bonding can be subjected to a deep-drawing process without deteriorating the color developing structure of the structural color formed by the thermoplastic polyurethane, and enables production of a molded article having a large aspect ratio with good accuracy, and a resulting molded article can retain the color developing structure and the shape.

The present invention has been completed base on these findings.

That is, the present invention provides a laminate including a polyamide layer (1) and a thermoplastic polyurethane layer (2) having a color developing structure of structural color.

The present invention also provides the laminate, where the thermoplastic polyurethane layer (2) is a thermoplastic polyurethane layer having a structure having recesses and protrusions on a face that is opposite a face in contact with the polyamide layer (1).

The present invention also provides the laminate, where a metal layer (3) is laminated on the face having the structure having recesses and protrusions of the thermoplastic polyurethane layer (2).

The present invention also provides the laminate, where the thermoplastic polyurethane layer (2) is a layer formed from an alternate laminate of two types of thermoplastic polyurethane layers having a difference in refractive indexes of 0.03 or greater.

The present invention also provides the laminate, where a melting point of a polyamide constituting the polyamide layer (1) and a decomposition initiation temperature of a thermoplastic polyurethane constituting the thermoplastic polyurethane layer (2) satisfy a relationship below.

$$\text{Melting point of polyamide}(°\text{C.})+10°\text{C.} \leq \text{Decomposition initiation temperature of thermoplastic polyurethane}(°\text{C.})$$

The present invention also provides the laminate, where a terminal amino group amount of a polyamide constituting the polyamide layer (1) is 10 mmol/kg or greater.

The present invention also provides the laminate, where a polyamide constituting the polyamide layer (1) contains a polymer chain having a repeating unit represented by Formula (1) below.

[Chem. 1]

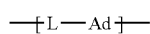
(1)

In the formula, L represents a divalent aliphatic hydrocarbon group having from 10 to 15 carbons, and Ad represents an amide bond.

The present invention also provides the laminate, where a polyamide constituting the polyamide layer (1) is a polyamide elastomer.

The present invention also provides the laminate, where a thermoplastic polyurethane constituting the thermoplastic polyurethane layer (2) is a polyester urethane elastomer and/or a polyether urethane elastomer.

The present invention also provides the laminate, where the laminate is for a deep-drawing process with an aspect ratio (depth/internal diameter of opening) of 0.001 or greater.

The present invention also provides a method for producing a molded article including vacuum-molding, pressure-molding, or vacuum-pressure-molding the laminate described above to obtain a molded article having a recessed part or a protruded part with an aspect ratio (depth/internal diameter of opening) of 0.001 or greater.

Advantageous Effects of Invention

The laminate according to an embodiment of the present invention has a color developing structure of a structural color and can be subjected to a deep-drawing process without deteriorating the structure. Furthermore, the polyamide layer (1) and the thermoplastic polyurethane layer (2) are firmly bonded without interposing an adhesive layer therebetween. Thus, gaps do not occur in between the polyamide layer (1) and the thermoplastic polyurethane layer (2) when a deep-drawing process by vacuum-molding is performed, avoiding generation of voids due to the occurrence of gaps. Furthermore, although an adhesive layer easily deteriorates over time, loss of good appearance due to deterioration of an adhesive layer can be also avoided because no adhesive layer is provided.

Furthermore, because a suitably flexible thermoplastic polyurethane layer (2) is contained, the laminate according to an embodiment of the present invention suitably conforms to a mold, and a deep-drawing process can be performed with good accuracy. A molded article obtained by subjecting the laminate to a deep-drawing process can stably retain the shape because a suitably hard polyamide layer (1) is contained.

Therefore, the laminate according to an embodiment of the present invention can be suitably used for a deep-drawing process.

Furthermore, a molded article obtained by the production method according to an embodiment of the present invention can stably have the shape obtained by the deep-drawing process with good accuracy, does not undergo loss of color due to, for example, irradiation of UV light, and can maintain good appearance for a long period of time. The molded article can be thus suitably used as, for example, a container required to generate a structural color.

DESCRIPTION OF EMBODIMENTS

Laminate

The laminate according to an embodiment of the present invention has a polyamide layer (1) and a thermoplastic polyurethane layer (2), and the thermoplastic polyurethane layer (2) has a color developing structure of a structural color.

Because the laminate according to an embodiment of the present invention has the configuration described above, the laminate is suitable for performing a deep-drawing process using a protruded mold or a recessed mold with an aspect ratio of, for example, 0.001 or greater by vacuum-molding, suitably conforms to a mold without causing cracks, and can form a molded article having excellent transfer accuracy of a mold. Therefore, the laminate according to an embodiment of the present invention can be suitably used for a deep-drawing process [that is, for processing using a protruded mold or a recessed mold with an aspect ratio of, for example, 0.001 or greater].

The aspect ratio of a mold used for molding (protruded mold or recessed mold), which is calculated from the following equation in the present specification is, for example, 0.001 or greater, preferably 0.01 or greater, particularly preferably 0.05 or greater, and most preferably 0.1 or greater. Note that the upper limit of the aspect ratio is, for example, 10, preferably 4, particularly preferably 3, and most preferably 2.

Aspect ratio of protruded mold=Height of protruded part/Internal diameter of base part of protruded part Aspect ratio of recessed mold=Depth of recessed part/Internal diameter of opening of recessed part Polyamide Layer (1)

The polyamide layer according to an embodiment of the present invention is at least one layer formed from a polyamide.

The thickness of the polyamide layer (in the case of two or more layers, the total thickness) is, for example, from 30 to 5000 μm, preferably from 50 to 3000 μm, and particularly preferably from 200 to 2000 μm.

Furthermore, the thickness of the polyamide layer (1) is, for example, from 3 to 500, preferably from 3 to 200, and particularly preferably from 3 to 40, relative to a thickness of 1 of the thermoplastic polyurethane layer (2) described below (in the case where the laminate has a thermoplastic polyurethane layer (4), the total thickness of the thermoplastic polyurethane layer (2) and the thermoplastic polyurethane layer (4)).

When the thickness of the polyamide layer (1) is in the range described above, a deep-drawing process can be suitably performed, and excellent shape retaining effect of the molded article obtained by the deep-drawing process can be achieved. When the thickness of the polyamide layer (1) is less than the range described above, retention of the shape of the molded article obtained by the deep-drawing process tends to be difficult. On the other hand, when the thickness of the polyamide layer (1) is greater than the range described above, performance of a deep-drawing process becomes difficult, and shape accuracy tends to decrease because cracks occur and the shape cannot conform to a mold.

The polyamide constituting the polyamide layer is firmly bonded to the thermoplastic polyurethane constituting the thermoplastic polyurethane layer (2) by chemical bonding. Thus, the polyamide layer (1) and the thermoplastic polyurethane layer (2) can be firmly bonded and fixed without interposing an adhesive layer in between the polyamide layer (1) and the thermoplastic polyurethane layer (2), and do not peel off during a deep-drawing process by vacuum-molding, for example. Because of this, generation of voids can be suppressed, and a molded article having good appearance can be produced.

The polyamide is appropriately hard, and the hardness thereof (e.g. Shore D hardness) is, for example, from 40 to 90, preferably from 45 to 85, more preferably from 50 to 80, and especially preferably from 55 to 75. According to a polyamide layer formed from a polyamide having the hardness described above, toughness can be imparted to a molded article obtained by a deep-drawing process, and the shape of the molded article can be stably retained.

Furthermore, in the laminate according to an embodiment of the present invention, a melting point (° C.) of a polyamide constituting the polyamide layer and a decomposition initiation temperature (° C.) of a thermoplastic polyurethane constituting the thermoplastic polyurethane layer (2) preferably satisfy the following relationship from the perspectives of being capable of performing a deep-drawing process without deteriorating the structural color or deteriorating the color developing structure of the thermoplastic polyurethane layer (2) having the color developing structure of the structural color.

Melting point of polyamide(° C.)+10° C.≤Decomposition initiation temperature of thermoplastic polyurethane(° C.)

Thus, the difference between the decomposition initiation temperature (° C.) of the thermoplastic polyurethane and the melting point (° C.) of the polyamide [decomposition initiation temperature (° C.) of thermoplastic polyurethane−melting point (° C.) of polyamide] is 10° C. or higher. The difference of the temperatures is preferably 20° C. or higher, and particularly preferably 30° C. or higher, from the perspective of being capable of performing a deep-drawing process without deteriorating the color developing structure of the structural color.

The melting point (° C.) of the polyamide is preferably 250° C. or lower, more preferably 230° C. or lower, particularly preferably 200° C. or lower, most preferably 185° C. or lower, and especially preferably 175° C. or lower. The lower limit of the melting point of the polyamide is, for example, approximately 100° C., and preferably 110° C.

Note that the melting point of the polyamide can be measured by a differential scanning calorimeter (DSC).

The polyamide includes crystalline polyamide and amorphous polyamide. In the case where transparency is required, use of amorphous polyamide is preferred.

The polyamide is a compound containing at least a repeating unit having an amide bond. In particular, the polyamide preferably has at least a polymer chain that is characterized by a repeating unit having an amide bond, produced by, for example, polycondensation of a diamine component and a dicarboxylic acid component that are monomers, polycondensation of amino acids having an amino group and a carboxylic acid in one molecule, or ring-opening polymerization of lactams that are monomers. Note that, for each of the diamine component, dicarboxylic acid component, amino acid having an amino group and a carboxyl group in one molecule, and lactams, one type thereof can be used alone, or a combination of two or more types thereof can be used.

Examples of the diamine component include compounds represented by Formula (a) below.

$$H_2N-L^1-NH_2 \quad \text{(a)}$$

In the formula, $L^1$ represents a divalent hydrocarbon group.

The divalent hydrocarbon group includes a divalent aliphatic hydrocarbon group, a divalent alicyclic hydrocarbon group and a divalent aromatic hydrocarbon group.

Examples of the divalent aliphatic hydrocarbon group include straight-chain or branched alkylene groups having from 1 to 20 carbons, such as a methylene group, a methylmethylene group, a dimethylmethylene group, an ethylene group, a propylene group, and a trimethylene group; straight-chain or branched alkenylene groups having from 2 to 20 carbons, such as vinylene, 1-methylvinylene, propenylene, 1-butenylene, 2-butenylene, 1-pentenylene, and 2-pentenylene groups; and straight-chain or branched alkynylene groups having from 2 to 20 carbons, such as ethynylene, propynylene, 3-methyl-1-propynylene, butynylene, 1,3-butadiynylene group, 2-pentynylene, 2-pentynylene, 2,4-pentadiynylene, 2-hexynylene, 1,3,5-hexatriynylene, 3-heptynylene, 4-octynylene, 4-nonynylene, 5-decynylene, 6-undecynylene, and 6-dodecynylene groups.

The divalent alicyclic hydrocarbon group is a group obtained by removing two hydrogen atoms from the structural formula of an alicycle, and examples of the alicycle include 3 to 20-membered cycloalkane rings, such as cyclopropane, cyclopentane, cyclohexane, cycloheptane, and cyclooctane rings; 3 to 20-membered cycloalkene rings, such as cyclopentene and cyclohexene rings; and crosslinking rings, such as perhydronaphthalene, norbornane, norbornene, adamantane, tricyclo[5.2.1.0$^{2,6}$]decane, and tetracyclo[4.4.0.1$^{2,5}$0.1$^{7,10}$]dodecane rings. The alicycle may have a substituent (e.g., an alkyl group having from 1 to 5 carbons). Furthermore, two or more alicycles may be bonded through a single bond or a linking group (e.g., a divalent aliphatic hydrocarbon group).

The divalent aromatic hydrocarbon group is a group obtained by removing two hydrogen atoms from a structural formula of an aromatic ring, and examples of the aromatic ring include aromatic rings having from 6 to 20 carbons, such as benzene, naphthalene, anthracene, and fluorene rings. The aromatic ring may have a substituent (e.g., an alkyl group having from 1 to 5 carbons, a cycloalkyl group having from 3 to 6 carbons). Furthermore, two or more aromatic rings may be bonded through a single bond or a linking group (e.g., a divalent aliphatic hydrocarbon group or a divalent alicyclic hydrocarbon group).

Examples of the compound in which $L^1$ in Formula (a) above is a divalent aliphatic hydrocarbon group (that is, aliphatic diamine) include hexamethylenediamine and trimethylhexamethylenediamine.

Examples of the compound in which $L^1$ in Formula (a) above is a divalent alicyclic hydrocarbon group (that is, alicyclic diamine) include bis(p-aminocyclohexyl)methane and bis(4-amino-3-methylcyclohexyl)methane.

Examples of the compound in which $L^1$ in Formula (a) above is a divalent aromatic hydrocarbon group (that is, aromatic diamine) include m-xylylenediamine.

Examples of the dicarboxylic acid component include compounds represented by Formula (c) below.

$$HOOC-L^2-COOH \quad \text{(c)}$$

In the formula, $L^2$ represents a divalent hydrocarbon group.

The divalent hydrocarbon group of $L^2$ take the same examples as those for the divalent hydrocarbon group of $L^1$.

Examples of the compound in which $L^2$ in Formula (c) above is a divalent aliphatic hydrocarbon group (that is, aliphatic dicarboxylic acid) include adipic acid and dodecanedioic acid.

Examples of the compound in which $L^2$ in Formula (c) above is a divalent alicyclic hydrocarbon group (that is, alicyclic dicarboxylic acid) include cyclohexane-1,4-dicarboxylic acid.

Examples of the compound in which $L^2$ in Formula (c) above is a divalent aromatic hydrocarbon group (that is, aromatic dicarboxylic acid) include isophthalic acid and terephthalic acid.

Examples of the amino acid having an amino group and a carboxyl group in one molecule include α-amino acids, such as alanine, 2-aminobutyric acid, valine, norvaline, leucine, norleucine, tert-leucine, isoleucine, serine, threonine, cysteine, methionine, 2-phenylglycine, phenylalanine, tyrosine, histidine, tryptophan, and proline; and β-amino acids, such as 3-aminobutyric acid.

Examples of the lactams include lactams having a 3 to 13-membered ring, such as α-lactam, β-lactam, γ-lactam, δ-lactam, ε-caprolactam, undecano-10-lactam, undecano-11-lactam, and dodecano-12-lactam.

The polymer chain that is characterized by a repeating unit having an amide bond (or containing a repeating unit having an amide bond) is particularly preferably a polymer chain having a repeating unit represented by Formula (1) below from the perspective of having an appropriate flexibility.

[Chem. 2]

(1)

In the formula, L represents a divalent aliphatic hydrocarbon group having from 10 to 15 carbons, and Ad represents an amide bond (—CONH— or —NHCO—).

Examples of the divalent aliphatic hydrocarbon group having from 10 to 15 carbons is preferably an alkylene group having from 10 to 15 carbons, particularly preferably an alkylene group having from 10 to 14 carbons, and most preferably an alkylene group having from 10 to 13 carbons.

The polyamide may be a compound formed from only a polymer chain that is characterized by a repeating unit having an amide bond described above or a compound formed by polymerizing the polymer chain described above and another polymer chain. Note that the polymerization form may be a random type or a block type.

Among these, the polyamide is preferably a compound obtained by polymerizing (particularly preferably block polymerization) the polymer chain that is characterized by a repeating unit having an amide bond described above and another polymer chain from the perspectives of achieving both appropriate hardness and flexibility, being capable of performing a deep-drawing process with good accuracy, and achieving excellent shape retaining effect of a molded article obtained by the deep-drawing process.

In particular, the compound obtained by polymerizing the polymer chain that is characterized by a repeating unit having an amide bond and another polymer chain is preferably a polyamide elastomer obtained by polymerizing (particularly preferably, block polymerizing) a polymer chain (H) that is characterized by a repeating unit having an amide bond and a polymer chain (S) having superior flexibility to that of the polymer chain (H) from the perspective of being capable of further firmly bonding to the thermoplastic polyurethane constituting the thermoplastic polyurethane layer (2) due to the polymer chain (H) acting as a hard segment and the polymer chain (S) acting as a soft segment, from the perspectives of being capable of adequately conforming to a mold even when a heat-molding temperature is low due to softening occurring at a temperature lower than that of a polyamide formed from only a hard segment and thus being capable of performing molding without deteriorating the color developing structure of the structural color, and from the perspectives of having viscoelastic properties and appropriate hardness and flexibility [hardness (Shore D hardness) is, for example, from 40 to 80, preferably from 50 to 75, and more preferably from 55 to 75], being capable of performing a deep-drawing process with good accuracy, and stably retaining the shape of the molded article obtained by the deep-drawing process. Note that the hardness can be controlled by adjusting the proportions of the hard segment and the soft segment.

The flexural modulus of the polyamide elastomer is, for example, 100 to 3000 MPa, preferably from 150 to 2500 MPa, particularly preferably from 200 to 2000 MPa, most preferably from 200 to 1500 MPa, and especially preferably from 200 to 1000 MPa. The flexural modulus of the polyamide elastomer can be measured by a method in accordance with ISO 178.

As the polymer chain (S) having superior flexibility to that of the polymer chain (H), for example, a polymer chain selected from a polyether, a polyester, or a polycarbonate, and a polyether chain is especially preferred.

The polyamide elastomer which is a block copolymer of the polymer chain (H) and the polymer chain (S) can be produced by co-polycondensating the polymer chain (S) having a reactive terminal group to a reactive terminal group of the polymer chain (H). Examples of the reactive terminal group include an amino group and a carboxyl group.

The polyether chain as the polymer chain (S) can be produced by (co)polymerizing a diol component.

Examples of the diol component include aliphatic diols, such as ethylene glycol, propylene glycol, tetramethylene glycol, 2-methyl-1,3-propane diol, hexane diol, 3-methyl-1,5-pentane diol, 2,2-diethyl-1,3-propane diol, 1,9-nonane diol, and 2-methyl-1,8-octane diol; and aromatic diols, such as dihydroxy benzene, dihydroxy toluene, dihydroxy biphenyl, and bisphenol A.

Furthermore, the polyamide that forms the polyamide layer preferably has the terminal amino group amount of, for example, 10 mmol/kg or greater (preferably from 10 to 300 mmol/kg, particularly preferably from 15 to 200 mmol/kg, and most preferably from 20 to 150 mmol/kg) from the perspective of obtaining a polyamide layer having excellent oxidative deterioration resistance.

The terminal amino group amount of the polyamide that forms the polyamide layer can be controlled by, for example, adjusting the blending proportions of a polyamide having a high terminal amino group concentration and a polyamide having a low terminal amino group concentration.

As the polyamide, for example, a commercially available product such as trade name "E58S4" (polyamide elastomer, available from Daicel-Evonik Ltd.) may be used.

An additive can be added to the polyamide as necessary. Examples of the additive include inorganic fillers, organic fillers, glass fibers, carbon fibers, light controlling materials, light absorbers (e.g., ultraviolet light, blue light, infrared light), coloring agents, thermostabilizers, photostabilizers, antioxidants, plasticizers, flame retardants, antistatic agents, and viscosity modifiers. The content of the additive is, for example, approximately from 0 to 20 parts by weight per 100 parts by weight of the polyamide.

Thermoplastic Polyurethane Layer (2)

The thermoplastic polyurethane layer (2) according to an embodiment of the present invention is a layer formed from a thermoplastic polyurethane (TPU) and has a color developing structure of a structural color.

The thermoplastic polyurethane constituting the thermoplastic polyurethane layer (2) is appropriately soft, and the hardness thereof is a Shore A hardness of, for example, 50 to 96 (preferably from 60 to 96) and a Shore D hardness of, for example, 30 to 60 (preferably from 30 to 50). Thus, when a deep-drawing process is performed by vacuum-molding, the shape of a mold can be transferred with good accuracy due to good conformability to the mold.

The thickness of the thermoplastic polyurethane layer (2) (in the case where the laminate has a thermoplastic polyurethane layer (4) described below, the total thickness of the thermoplastic polyurethane layer (2) and the thermoplastic polyurethane layer (4)) is, for example, from 10 to 1000 µm, preferably from 30 to 500 µm, and particularly preferably from 50 to 250 µm.

Furthermore, the thickness of the thermoplastic polyurethane layer (2) (in the case where the laminate has a thermoplastic polyurethane layer (4) described below, the total thickness of the thermoplastic polyurethane layer (2) and the thermoplastic polyurethane layer (4)) is, for example, from 0.05 to 500, preferably from 0.1 to 200, more preferably from 0.1 to 40, particularly preferably from 0.1 to 10, and most preferably from 0.1 to 1.0, relative to a thickness of 1 of the polyamide layer (1).

When the thickness of the thermoplastic polyurethane layer (2) is in the range described above, the shape of a mold can be transferred with good accuracy due to good conformability to the mold when a deep-drawing process is performed by vacuum-molding, and a resulting molded article can suitably maintain the shape thereof. When the thickness of the thermoplastic polyurethane layer (2) is less than the range described above, molding processability tends to decrease. On the other hand, when the thickness of the thermoplastic polyurethane layer (2) is greater than the range described above, the shape of the molded article tends to be difficult to maintain.

A color developing structure of a structural color is a structure that causes diffraction, refraction, interference, or scattering of light. Examples of the method of forming a color developing structure include the following methods.

[1] A method in which a fine structure that causes a wavelength of light or causes diffraction and interference of light on a surface of the thermoplastic polyurethane layer (2) (e.g., a recessed part or protruded part of 3 µm or less).

[2] A method in which thermoplastic polyurethane layers (2) having different refractive indexes are laminated alternately.

Thus, in the case where a laminate according to an embodiment of the present invention is formed, the thermoplastic polyurethane layer (2) according to an embodiment of the present invention include a thermoplastic polyurethane layer having a fine structure that causes diffraction, refraction, interference, or scattering of light on a face that is opposite a face of incidence of light [=thermoplastic polyurethane layer (2-1)] and a layer (2-2) obtained by alternately laminating thermoplastic polyurethane layers having different refractive indexes [=thermoplastic polyurethane layer (2-2)].

The fine structure in [1] above is preferably provided on a surface that is opposite the light incidence face of the film and, for example, is a structure in which linear recessed parts or protruded parts are arranged in parallel in a cycle of micrometer size. When light enters from a face that is opposite the face having the structure of the thermoplastic polyurethane layer having the structure described above, interference fringes (iridescent color) appear due to diffraction and interference of the incident light.

Examples of the fine structure include, in addition to the structure described above, structures in which three-dimensional fine recessed parts or protruded parts, such as those triangular roof-shaped, trapezoidal roof-shaped, hemispherical roof-shaped, or semielliptical roof-shaped, are randomly arranged in a two-dimensional direction. Note that a plurality of arranged recessed parts may all have the same depth or may have different depths. Furthermore, a plurality of arranged protruded parts may all have the same height or may have different heights. When light enters from a face that is opposite the face having the structure of the thermoplastic polyurethane layer having the structure described above, a part of the incident light is reflected and another part is transmitted to impart 1/f fluctuation that varies irregularly to brilliance and chroma of light, and an effect of emphasizing light and shade of the light is exhibited.

The fine structure in [1] above can be formed by, for example, etching or imprint-molding one surface of the thermoplastic polyurethane layer.

For the method in which thermoplastic polyurethane layers having different refractive indexes are laminated alternately of [2] above, two types of thermoplastic polyurethane layers having different refractive indexes are preferably laminated alternately and, in particular, 30 layers or more (more preferably 200 layers or more) are preferably laminated.

As the thermoplastic polyurethane layers having different refractive indexes, two types of thermoplastic polyurethane layers having a refractive index difference of, for example, 0.03 or greater (preferably 0.05 or greater, particularly preferably 0.10 or greater) are preferred and, in particular, a layer formed from an alternate laminate of two types of thermoplastic polyurethane layers having a refractive index difference of, for example, 0.03 or greater is preferred. Adjustment of a refractive index of a thermoplastic polyurethane layer is performed by, for example, adding a filler (e.g., silica filler) to a thermoplastic polyurethane that forms the layer.

In the method in which thermoplastic polyurethane layers having different refractive indexes are laminated alternately of [2] above, a metallic structural color can be obtained by setting the relative reflectivity at a wavelength range of 400 to 1000 nm of the thermoplastic polyurethane layer to 30% or greater (preferably 40% or greater, and particularly preferably 80% or greater).

Thermoplastic Polyurethane

The thermoplastic polyurethane that forms the thermoplastic polyurethane layer (2) is a polymer having a urethane bond (—NHCOO—) and is a rubber elastomer obtained by an addition reaction of a polyisocyanate, a high molecular weight polyol, and a chain extender. The thermoplastic polyurethane has a hard segment formed from a reaction of a polyisocyanate and a chain extender and a soft segment formed from a reaction of a polyisocyanate and a high molecular weight polyol.

The decomposition initiation temperature of a thermoplastic polyurethane is approximately from 230 to 250° C. At this temperature or higher, the thermoplastic polyurethane is decomposed and a color developing structure of a structural color is deteriorated due to generation of $CO_2$ and $H_2O$ gases.

The proportion of the hard segment in the total amount of the thermoplastic polyurethane is, for example, from 30 to 60 wt. % from the perspective of achieving excellent molding processability. When the proportion of the hard segment is less than the range described above, flexibility becomes too high, and the color developing structure of the structural color may be deteriorated when vacuum-molding is performed. On the other hand, when the proportion of the hard segment is greater than the range described above, flexibility becomes low, and performance of a deep-drawing process with good accuracy tends to be difficult.

The thermoplastic polyurethane can be produced by, for example, a method in which a polyisocyanate and a high molecular weight polyol are reacted to obtain an isocyanate group-terminated prepolymer having an isocyanate group at a molecular terminal, and the obtained isocyanate group-terminated prepolymer is reacted with a chain extender (prepolymer method).

As the used amount of the polyisocyanate, the high molecular weight polyol, and the chain extender, the equivalent ratio of isocyanate groups in the polyisocyanate relative to the total amount of hydroxy groups in the high molecular weight polyol and the chain extender (NCO/OH) is, for example, from 0.8 to 1.2 (preferably from 0.9 to 1.1, and particularly preferably from 0.98 to 1.05).

As the compound having an isocyanate group, a polyisocyanate compound is preferred. Examples thereof include 2,4-tolylene diisocyanate, 2,6-tolylene diisocyanate, 1,3-xylene diisocyanate, 1,4-xylene diisocyanate, xylylene diisocyanate, 1,5-naphthalene diisocyanate, m-phenylene diisocyanate, p-phenylene diisocyanate, diphenylmethane diisocyanate, 4,4'-diphenylmethane diisocyanate, 4,4'-dibenzyl diisocyanate, isophorone diisocyanate, hexamethylene diisocyanate, dicyclohexylmethane diisocyanate, 2,2,4-trimethylhexamethylene diisocyanate, 2,4,4-trimethylhexamethylene diisocyanate, triphenylmethane triisocyanate, dimethylene triphenyl triisocyanate, and hydrogenated products of compounds each having aromatic ring(s) among the diisocyanate compounds described above (e.g. hydrogenated xylylene diisocyanate, hydrogenated diphenylmethane diisocyanate).

As the high molecular weight polyol, a compound having two or more hydroxy groups and having a number average molecular weight of 400 or greater (e.g. from 400 to 5000, preferably from 1000 to 4000, and more preferably 1500 to 3000) is preferred. Examples of the compound include polyether polyols, polyester polyols, polycarbonate polyols, acrylic polyols, epoxy polyols, natural oil polyols, silicone polyols, fluoropolyols, polyolefin polyols, and polyurethane polyols.

Among these, as the high molecular weight polyol, a polyether polyol and/or a polyester polyol is preferred from the perspective of flexibility. Therefore, as the thermoplastic polyurethane according to an embodiment of the present invention, a compound obtained by reacting a polyisocyanate and a polyether polyol and/or a polyester polyol (that is, a polyester urethane elastomer and/or a polyether urethane elastomer) is preferred.

Examples of the polyether polyol include polyoxy $C_{2-4}$ alkylene glycols, such as polyethylene glycol, polypropylene glycol, polybutylene glycol, polyethylene polypropylene glycol, polyethylene polybutylene glycol, and polypropylene polybutylene glycol.

Examples of the polyester polyol include lactone-based polyols, such as polycaprolactone polyol and polyvalerolactone polyol.

Examples of the chain extender include diols, such as ethylene glycol, propylene glycol, butylene glycol, 1,4-butane diol, butene diol, butyne diol, xylylene glycol, amylene glycol, 1,4-phenylene-bis-β-hydroxyethyl ether, 1,3-phenylene-bis-β-hydroxyethyl ether, bis-(hydroxymethyl-cyclohexane), hexane diol, and thiodiglycol; diamines, such as ethylene diamine, propylene diamine, butylene diamine, hexamethylene diamine, cyclohexalene diamine, phenylene diamine, tolylene diamine, xylylene diamine, 3,3'-dichlorobenzidine, and 3,3'-dinitrobenzidine; and alkanolamines, such as ethanolamine, aminopropyl alcohol, 2,2-dimethylpropanolamine, 3-aminocyclohexyl alcohol, and p-aminobenzyl alcohol.

As the thermoplastic polyurethane, for example, a commercially available product such as trade name "Higress" (available from Sheedom Co., Ltd.) may be used.

An additive can be added to the thermoplastic polyurethane as necessary. Examples of the additive include light controlling materials, light absorbers (e.g. ultraviolet light, blue light, infrared light), coloring agents, thermostabilizers, photostabilizers, antioxidants, plasticizers, flame retardants, antistatic agents, and viscosity modifiers. The content of the additive is, for example, approximately from 0 to 20 parts by weight per 100 parts by weight of the thermoplastic polyurethane.

Another layer may be laminated on the laminate according to an embodiment of the present invention in addition to the polyamide layer (1) and the thermoplastic polyurethane layer (2). For example, in the case where the thermoplastic polyurethane layer (2) is a thermoplastic polyurethane layer (2-1) and a metallic structural color is desired, a metal layer (3) (e.g., a metal layer containing at least one metal selected from aluminum, silver, copper, chromium, tin, nickel, silicon oxide, or zinc sulfide (preferably a metal thin layer) is preferably provided on a face having a fine structure of the thermoplastic polyurethane layer (2-1). Examples of the method of providing a metal layer include a method by deposition and a method in which a metal foil is adhered by an adhesive. Furthermore, in the case where a metal layer is provided, the metal layer may be provided on the entire face having the fine structure of the thermoplastic polyurethane layer (2-1) or may be provided on a part thereof.

The thickness of the metal layer (3) is, for example, from 0.001 to 10 μm, preferably from 0.01 to 7 μm, and particularly preferably from 0.02 to 5 μm, from the perspective of exhibiting a good metallic structural color.

Furthermore, in the case where the metal layer (3) is provided, a thermoplastic polyurethane layer (4) is preferably further laminated on the surface thereof (=face that is opposite the face in contact with the thermoplastic polyurethane layer (2)) in order to protect the metal layer (3). That is, in the case where the laminate according to an embodiment of the present invention has the metal layer (3), the laminate preferably has a structure of polyamide layer (1)/thermoplastic polyurethane layer (2)/metal layer (3)/thermoplastic polyurethane layer (4).

The metal layer (3) and the thermoplastic polyurethane layer (4) can be laminated with an adhesive layer interposed therebetween. As an adhesive constituting the adhesive layer, a common adhesive, such as an acrylic, urethane-based (such as urethane ester-based and urethane ether-based), epoxy-based, or vinyl acetate-based adhesive, can be used. Among these, urethane-based (such as urethane ester-based and urethane ether-based) adhesives are preferably used because excellent adhesive strength is achieved, and the moldability by vacuum-molding or the like is not deteriorated. For example, a dry laminate adhesive formed from a combination of a main agent, such as an ester-based polyurethane "TM-595", and a curing agent (such as trade names "CAT-10L" and "CAT-RT85"), available from Toyo-Moton, Ltd., are commercially available.

The adhesive is preferably applied in such a manner that the thickness after curing is, for example, from 0.1 to 40 μm, preferably from 1 to 30 μm, and particularly preferably from 5 to 20 μm.

The adhesive can be applied by, for example, printing methods and coating methods. Specific examples include methods such as screen printing methods, mask printing methods, offset printing methods, inkjet printing methods, flexographic printing methods, gravure printing methods, stamping, dispensing, squeegee printing methods, silk screen printing methods, spraying and brushing.

The total thickness of the laminate according to an embodiment of the present invention can be appropriately changed depending on the use and is, for example, preferably approximately from 0.05 to 6 mm, and particularly preferably from 0.1 to 2 mm.

The laminate according to an embodiment of the present invention generates a structural color. Furthermore, the laminate can be, for example, vacuum-molded without deteriorating the color developing structure of the structural color and can produce a molded article that generates the structural color and that is formed by suitably transferring the shape of the mold (even when the shape has a recessed part or a protruded part with a high aspect ratio). Thus, the laminate according to an embodiment of the present invention can be suitably used for producing a molded article that generates a structural color by vacuum-molding, pressure-molding, or vacuum-pressure-molding. The laminate according to an embodiment of the present invention can be suitably used for producing a molded article that generates a structural color and that has a recessed part or a protruded part with a high aspect ratio by vacuum-molding, pressure-molding, or vacuum-pressure-molding.

Furthermore, when the laminate according to an embodiment of the present invention is subjected to a deep-drawing process, no peeling occurs because the polyamide layer (1) and the thermoplastic polyurethane layer (2) are firmly bonded by chemical bonding without interposing an adhesive layer between the polyamide layer (1) and the thermoplastic polyurethane layer (2). Because of this, generation of voids can be suppressed, and a molded article having good appearance can be produced. Furthermore, the adhesive tends to be discolored due to deterioration over time and tends to be brittle. Therefore, a laminate having an adhesive layer or a molded article formed from such a laminate had problems of deterioration of strength and good appearance due to deterioration over time. However, use of the laminate according to an embodiment of the present invention can solve the problems caused by deterioration over time of such an adhesive.

Molded Article Production Method

The method for producing a molded article according to an embodiment of the present invention including vacuum-molding, pressure-molding, or vacuum-pressure-molding the laminate described above to obtain a molded article having a recessed part or a protruded part with an aspect ratio (depth/internal diameter of opening) of 0.001 or greater.

Note that the vacuum molding is a method in which the laminate according to an embodiment of the present invention is heated and softened, a mold having a desired shape (e.g., protruded mold, recessed mold) is covered by the laminate, and the laminate is brought into tight contact with the mold by vacuum suction to perform molding.

The pressure molding is a method similar to the vacuum molding except for bringing the laminate into tight contact with the mold by compressed-air in stead of vacuum suction.

The vacuum-pressure molding is a method similar to the vacuum molding except for bringing the laminate into tight contact with the mold by simultaneously performing vacuum suction and compressed-air contact or by performing the vacuum suction and the compressed-air contact with a time difference.

The heating temperature (or molding temperature) at the time of heating and softening the laminate is preferably a temperature that is not lower than the softening point of the thermoplastic polyurethane constituting the thermoplastic polyurethane layer (2) and a temperature that is not lower than the temperature that softens the polyamide constituting the polyamide layer (1) to a degree enabling deformation of the polyamide (e.g., a temperature that is approximately 5 to 10° C. lower than the melting point of the polyamide). In particular, from the perspective of being capable of performing molding without deteriorating the color developing structure of the structural color of the thermoplastic polyurethane layer (2) and being capable of performing molding by suitably transferring the shape of the mold, a temperature that is not higher than the decomposition initiation temperature of the thermoplastic polyurethane (e.g., a temperature that is at least 5° C. lower than, preferably at least 10° C. lower than, particularly preferably at least 30° C. lower than, and most preferably at least 50° C. lower than, the decomposition initiation temperature of the thermoplastic polyurethane) is preferred. Thus, the heating temperature (or molding temperature) is, for example, from 130 to 250° C., preferably from 150 to 230° C., and particularly preferably from 150 to 200° C.

According to the production method according to an embodiment of the present invention, a molded article that generates the structural color and that is formed by suitably transferring the shape of the mold (even when the shape has a recessed part or a protruded part with a high aspect ratio) can be obtained.

EXAMPLES

Hereinafter, the present invention will be described more specifically with reference to examples, but the present invention is not limited by these examples.

Example 1

Production of Laminate

A polyamide film (1) [a film formed by using a crystalline polyamide elastomer, terminal amino group amount: 10 mmol/kg or greater, melting point: 168° C., thickness: 0.8 mm, Shore D hardness: 58, flexural modulus: 200 MPa, trade name "E58S4" (available from Daicel-Evonik Ltd.)] and a laminate of a thermoplastic polyurethane layer/aluminum deposition layer/thermoplastic polyurethane layer (50 μm/0.001 to 10 μm/100 μm) having one embossed face (decomposition initiation temperature of thermoplastic polyurethane: 230° C., trade name "urethane hologram", available from Murata Kimpaku Co., Ltd.) were adhered by applying a pressure while heated at 160° C., and thus a laminate (1) (PA/TPU having a color developing structure of a structural color/aluminum deposition layer/TPU, total thickness: approximately 950 to 960 μm) was obtained.

Production of Molded Article

The obtained laminate (1) was vacuum-molded (heating temperature: 190° C., heating time: 20 seconds) using a mold having a rectangular recessed part (depth: 3 cm, internal diameter of opening: 5 cm, aspect ratio: 0.6), and thus a molded article (1) was obtained. The molded article (1) generated a structural color and achieved excellent shape accuracy. Furthermore, the molded article (1) had an appropriate hardness, and the shape of the molded article was able to be maintained.

Example 2

Production of Laminate

Using a polyamide composition obtained by blending a polyamide resin having a high terminal amino group concentration (polyamide elastomer, terminal amino group amount: 10 mmol/kg or greater) in a polyamide resin having a low terminal amino group concentration (crystalline polyamide elastomer, terminal amino group amount: 10 mmol/kg or less), a polyamide film (2) (crystalline polyamide elastomer, terminal amino group amount: 10 mmol/kg or greater, melting point: 160° C., thickness: 0.8 mm, Shore D hardness: 70, flexural modulus: 1500 MPa) was obtained.

A laminate (2) (PA/TPU having a color developing structure of a structural color/aluminum deposition layer/TPU, total thickness: approximately 950 to 960 μm) was obtained in the same manner as in Example 1 except for using the polyamide film (2) in place of the polyamide film (1).

Production of Molded Article

A molded article (2) was obtained in the same manner as in Example 1 except for using the laminate (2) in place of the laminate (1). The molded article (2) generated a structural color and achieved excellent shape accuracy. Furthermore, the molded article (2) had an appropriate hardness, and the shape of the molded article was able to be maintained.

Example 3

Production of Laminate

Using a polyamide composition obtained by blending a polyamide elastomer (crystalline, terminal amino group amount: 10 mmol/kg or greater) in a polyamide elastomer (amorphous, terminal amino group amount: 10 mmol/kg or greater), a polyamide film (3) (terminal amino group amount: 10 mmol/kg or greater, melting point: 150° C., thickness: 0.8 mm, Shore D hardness: 65, flexural modulus: 380 MPa) was obtained.

A laminate (3) (PA/TPU having a color developing structure of a structural color/aluminum deposition layer/TPU, total thickness: approximately 950 to 960 μm) was obtained in the same manner as in Example 1 except for using the polyamide film (3) in place of the polyamide film (1).

Production of Molded Article

A molded article (3) was obtained in the same manner as in Example 1 except for using the laminate (3) in place of the laminate (1). The molded article (3) had a higher transparency than those of the molded articles (1) and (2). Furthermore, the molded article (3) generated a structural color and achieved excellent shape accuracy. Furthermore, the molded article (3) had an appropriate hardness, and the shape of the molded article was able to be maintained.

Comparative Example 1

A laminate (4) (TPU having a color developing structure of a structural color/aluminum deposition layer/TPU=50 μm/0.001 to 10 μm/100 μm, total thickness: approximately 150 to 160 μm) was obtained in the same manner as in Example 1 except for using no polyamide.

Furthermore, a molded article (4) was obtained in the same manner as in Example 1 except for using the laminate (4) in place of the laminate (1). The molded article (4) generated a structural color but was too flexible and too soft, and the shape of the molded article was not able to be maintained.

Comparative Example 2

A laminate (5) (PET/TPU having a color developing structure of a structural color/aluminum deposition layer/TPU=300 μm/50 μm/0.001 to 10 μm/100 μm, total thickness: approximately 450 to 460 μm) was obtained in the same manner as in Example 1 except for using a biaxially stretched PET film (melting point: 260° C., Shore D hardness: 85, flexural modulus: 2500 MPa) in place of the polyamide.

Furthermore, a molded article (5) was obtained in the same manner as in Example 1 except for using the laminate (5) in place of the laminate (1). The molded article (5) generated a structural color. However, because the laminate (5) was too hard and exhibited poor conformability to the mold, the transfer accuracy of the obtained molded article (5) was poor.

Comparative Example 3

A laminate (6) (PET/TPU having a color developing structure of a structural color/aluminum deposition layer/TPU=300 μm/50 μm/0.001 to 10 μm/100 μm, total thickness: approximately 450 to 460 μm) was obtained in the same manner as in Example 1 except for using a PET film for vacuum molding (amorphous, melting point: 254° C., Shore D hardness: 65, flexural modulus: 2100 MPa, trade name "A-PET FR", available from Teijin Limited) in place of the polyamide.

Furthermore, a molded article (6) was obtained in the same manner as in Example 1 except for using the laminate (6) in place of the laminate (1). The molded article (6) generated a structural color. However, adhesion between the PET and the TPU having the color developing structure of the structural color of the laminate (6) was poor, air entrainment (voids) occurred due to floating during the vacuum molding, and thus the appearance of the obtained formed article (6) was poor.

To summarize the above, configurations and variations according to an embodiment of the present invention will be described below.

[1] A laminate including a polyamide layer (1) and a thermoplastic polyurethane layer (2) having a color developing structure of structural color.

[2] The laminate according to [1], where the thermoplastic polyurethane layer (2) is a thermoplastic polyurethane layer having a structure having recesses and protrusions on a face that is opposite a face in contact with the polyamide layer (1).

[3] The laminate according to [2], where a metal layer (3) is laminated on the face having the structure having recesses and protrusions of the thermoplastic polyurethane layer (2).

[4] The laminate according to [1], where the thermoplastic polyurethane layer (2) is a layer formed from an alternate laminate of two types of thermoplastic polyurethane layers having a difference in refractive indexes of 0.03 or greater.

[5] The laminate according to any one of [1] to [4], where a melting point of a polyamide constituting the polyamide layer (1) and a decomposition initiation temperature of a thermoplastic polyurethane constituting the thermoplastic polyurethane layer (2) satisfy a relationship below.

Melting point of polyamide(° C.)+10° C.≤Decomposition initiation temperature of thermoplastic polyurethane(° C.)

[6] The laminate according to any one of [1] to [5], where a terminal amino group amount of a polyamide constituting the polyamide layer (1) is 10 mmol/kg or greater.

[7] The laminate according to any one of [1] to [6], where a polyamide constituting the polyamide layer (1) contains a polymer chain having a repeating unit represented by Formula (1).

[8] The laminate according to any one of [1] to [7], where a polyamide constituting the polyamide layer (1) is a polyamide elastomer.

[9] The laminate according to any one of [1] to [8], where a flexural modulus of a polyamide constituting the polyamide layer (1) is from 100 to 3000 MPa.

[10] The laminate according to any one of [1] to [9], where a Shore D hardness of a polyamide constituting the polyamide layer (1) is from 40 to 80.

[11] The laminate according to any one of [1] to [10], where a thermoplastic polyurethane constituting the thermoplastic polyurethane layer (2) is a polyester urethane elastomer and/or a polyether urethane elastomer.

[12] The laminate according to any one of [1] to [11], where a Shore D hardness of a thermoplastic polyurethane constituting the thermoplastic polyurethane layer (2) is from 30 to 60.

[13] The laminate according to any one of [1] to [12], where a thickness of the thermoplastic polyurethane layer (2) relative to a thickness of 1 of the polyamide layer (1) is from 0.05 to 40.

[14] The laminate according to any one of [1] to [13], where a thickness of the polyamide layer (1) relative to a thickness of 1 of the thermoplastic polyurethane layer (2) is from 3 to 40.

[15] The laminate according to any one of [1] to [14], where the laminate is for a deep-drawing process with an aspect ratio (depth/internal diameter of opening) of 0.001 or greater.

[16] Use of the laminate according to any one of [1] to [15] for a deep-drawing process with an aspect ratio calculated from equation below of 0.001 or greater.
Aspect ratio=Depth of drawing/Internal diameter of opening of drawing

[17] Use of the laminate according to any one of [1] to [15] for a deep-drawing process using a protruded mold or a recessed mold with an aspect ratio calculated from equation below of 0.001 or greater.
Aspect ratio of protruded mold=Height of protruded part/Internal diameter of base part of protruded part
Aspect ratio of recessed mold=Depth of recessed part/Internal diameter of opening of recessed part

[18] A method for producing a molded article by using the laminate according to any one of [1] to [15] to obtain a molded article having a recessed part or a protruded part with an aspect ratio (depth/internal diameter of opening) of 0.001 or greater.

[19] A method for producing a molded article including vacuum-molding, pressure-molding, or vacuum-pressure-molding the laminate according to any one of [1] to [15] to obtain a molded article having a recessed part or a protruded part with an aspect ratio (depth/internal diameter of opening) of 0.001 or greater.

INDUSTRIAL APPLICABILITY

According to the laminate according to an embodiment of the present invention, a deep-drawing process can be performed without deteriorating the structural color. The laminate according to an embodiment of the present invention can be thus suitably used as a raw material for, for example, a container required to generate a structural color.

The invention claimed is:

1. A laminate comprising a polyamide layer (1) and a color developing structure of structural color (2),
wherein the color developing structure of structural color (2) comprises a thermoplastic polyurethane layer/aluminum deposition layer/thermoplastic polyurethane layer having one embossed face.

2. The laminate according to claim 1, Therein a melting point of a polyamide constituting the polyamide layer (1) and a decomposition initiation temperature of a thermoplastic polyurethane constituting the color developing structure of structural color (2) satisfy a relationship below:
the melting point of the polyamide (° C.) 10° C.≤the decomposition initiation temperature of the thermoplastic polyurethane (° C.).

3. The laminate according to claim 1, wherein a terminal amino group amount of a polyamide constituting the polyamide layer (1) is 10 mmol/kg or greater.

4. The laminate according to claim 1, wherein a polyamide constituting the polyamide layer (1) contains a polymer chain having a repeating unit represented by Formula (1) below

(1)

where L represents a divalent aliphatic hydrocarbon group having from 10 to 15 carbons, and Ad represents an amide bond.

5. The laminate according to claim 1, wherein a polyamide constituting the polyamide layer (1) is a polyamide elastomer.

6. The laminate according to claim 1, wherein a thermoplastic polyurethane constituting the color developing structure of structural color (2) is a polyester urethane elastomer and/or a polyether urethane elastomer.

7. The laminate according to claim 1, wherein the laminate is for a deep-drawing process with an aspect ratio, depth/internal diameter of opening, of 0.001 or greater.

8. A method for producing a molded article comprising vacuum-molding, pressure-molding, or vacuum-pressure-molding the laminate according to claim 1 to obtain a molded article having a recessed part or a protruded part with an aspect ratio, depth/internal diameter of opening, of 0.001 or greater.

9. The laminate according to claim 1, wherein a flexural modulus of a polyamide constituting the polyamide layer (1) is from 100 to 3000 MPa.

10. The laminate according to claim 1, wherein a Shore D hardness of a polyamide constituting the polyamide layer (1) is from 40 to 80.

11. The laminate according to claim 1, wherein a thickness of the color developing structure of structural color (2) relative to a thickness of the polyamide layer (1) is from 0.05 to 40.

12. The laminate according to claim 1, wherein a thickness of the polyamide layer (1) is from 200 to 2000 μm.

13. The laminate according to claim 1, wherein a total thickness of the laminate is from 0.1 to 2 mm.

14. The laminate according to claim 1, wherein the laminate generates a structural color.

15. The laminate according to claim 1, wherein the polyamide layer (1) and the color developing structure of structural color (2) are bonded without interposing an adhesive layer between the polyamide layer (1) and the color developing structure of structural color (2).

16. The laminate according to claim 1, wherein the polyamide layer (1) is a single layer formed from crystalline polyamide elastomer.

* * * * *